United States Patent [19]
Casselman et al.

[11] Patent Number: 4,584,802
[45] Date of Patent: Apr. 29, 1986

[54] PROTECTIVE STRUCTURE FOR THE FLOOR OF A CONCRETE ENCLOSURE HAVING TO CONTAIN A HIGH TEMPERATURE FLUID

[75] Inventors: Chantal Casselman, Manosque; Jean C. Malet, Venelles; Yvon Sophy; Roger Pacton, both of Aix en Provence, all of France

[73] Assignee: Commissariat a l'Energie Atomique, France

[21] Appl. No.: 536,506

[22] Filed: Sep. 28, 1983

[30] Foreign Application Priority Data

Sep. 30, 1982 [FR] France .................. 82 16475

[51] Int. Cl.⁴ ........................... E02D 27/00
[52] U.S. Cl. ..................... 52/169.7; 52/293; 52/249; 220/1 B
[58] Field of Search ............ 52/168, 169.7, 248, 52/249, 267, 268, 269, 404, 454, 475, 477, 573, 592, 167, 293, 318; 220/1 B, 429, 437, 445

[56] References Cited

U.S. PATENT DOCUMENTS

| | | | |
|---|---|---|---|
| 1,160,340 | 11/1915 | Stretch | 52/293 |
| 3,288,988 | 11/1966 | Press, Jr. | 362/197 |
| 3,848,376 | 11/1974 | Elmore | 52/293 |
| 3,862,700 | 1/1975 | Noma et al. | 220/445 |
| 3,899,998 | 8/1975 | Menendez | 220/445 |
| 3,942,294 | 3/1976 | Savell, Jr. | 52/268 |
| 4,058,941 | 11/1977 | Zakrezewski et al. | 52/293 |
| 4,073,976 | 2/1978 | Dudzinski | 52/293 |
| 4,368,604 | 1/1983 | Spielau et al. | 52/592 |

FOREIGN PATENT DOCUMENTS

| | | | |
|---|---|---|---|
| 769350 | 10/1967 | Canada | 52/318 |
| 1492900 | 7/1967 | France | |
| 2226727 | 11/1974 | France | |
| 2300401 | 9/1976 | France | |
| 2321175 | 3/1977 | France | |
| 2397590 | 2/1979 | France | |
| 100513 | 8/1979 | Japan | 220/1 B |

Primary Examiner—John E. Murtagh
Assistant Examiner—Andrew Joseph Rudy
Attorney, Agent, or Firm—Kerkam, Stowell, Kondracki & Clarke

[57] ABSTRACT

The invention relates to a protective structure for a concrete enclosure able to contain a fluid, which can be raised to a high temperature.

Starting from the floor of the enclosure, the structure comprises a porous layer, intersecting shaped sections and a tight metal skin formed from plates, welded edge-to-edge along the axes of the shaped sections, after being fixed to the latter e.g. by weld spots. The cavities formed between the shaped sections receive concrete blocks and flexible joints. The metal skin has a peripheral rising portion along the walls of the enclosure and extending up to the maximum fluid level in the enclosure.

Application to enclosures having to receive hydrocarbons or liquid sodium, e.g. on the site of a fast neutron nuclear reactor.

7 Claims, 3 Drawing Figures

PROTECTIVE STRUCTURE FOR THE FLOOR OF A CONCRETE ENCLOSURE HAVING TO CONTAIN A HIGH TEMPERATURE FLUID

BACKGROUND OF THE INVENTION

The present invention relates to a protective structure for the floor of a concrete enclosure having to receive a fluid which can be raised to a high temperature, such as liquid sodium or a hydrocarbon.

An enclosure of this type can be more particularly used for carrying out tests in a large volume (several dozen tons) of sodium, petrol or a comparable fluid. Such an enclosure may merely constitue a liquid sodium retention enclosure, e.g. on the site of a fast neutron nuclear power station. It is desirable to be able to place a thermal protection for the concrete of the enclosure in the latter.

Moreover, the protective structure must be tight, so as to ensure that the fluid contained therein does not penetrate the concrete. More particularly, when the concrete contains sodium at a temperature of 200° C., the direct interaction between the sodium and the concrete would initially lead to a reaction between the sodium and the water contained in the concrete leading to the production of hydrogen and soda and would then lead to an infiltration of sodium into the concrete at a rate of 50 to 70 mm/hour. The hydrogen could then react with the oxygen in the air and cause a detonation, whose shock wave would entrain atomized sodium.

It is also desirable to have a protective structure, whose floor is as flat as possible and this flatness must be maintained no matter what the temperature of the fluid, i.e. independently of the differential expansion of the structure and the concrete enclosure. These characteriztics make it possible to prevent the formation of cracks in the protective structure and prevent the appearance of hotpoints resulting from a very localized punctiform contact. In certain applications, it may also be necessary to have a structure, whose floor is particularly flat, in order to permit the carrying out of manipulations on an air cushion before filling the enclosure. Finally, it is desirable to have a protective structure, which has a relatively low cost price and which can be easily repaired. To this end it must be possible to produce the protective structure in situ, within the actual enclosure which is to contain the fluid.

SUMMARY OF THE INVENTION

The present invention relates to a protective structure for a concrete enclosure meeting all the requirements referred to hereinbefore.

The present invention therefore specifically relates to a protective structure for the floor and walls of a concrete enclosure which is to contain a high temperature fluid, wherein it comprises a porous layer covering the concrete floor of the enclosure, a support frame made from shaped sections intersecting in accordance with a regular lattice structure, and resting on the porous layer, a lining filling the cavities defined between the shaped sections and a tight metal skin resting on the support frame and constituted by thin plates fixed to the shaped section and assembled by welds placed along the axes of the shaped sections, said metal skin having a peripheral rising portion along the walls of the enclosure, said peripheral rising portion defining a free edge positioned above the maximum fluid level in the enclosure.

In such a structure, the metal skin can be perfectly tight and flat and its production, and also possible repairs can be carried out without difficulty, within the actual enclosure. Moreover, the configuration of the support frame and the porous layer by means of which the metal skin rests on the floor of the enclosure is such that the skin is free to expand or contract with respect to the concrete of the enclosure without losing its flatness. The presence of the support frame and the porous layer also make it possible to thermally protect the concrete of the enclosure against the fluid contained therein.

Preferably, the lining between the shaped sections comprises concrete slabs filling the cavities and flexible joints formed between the slabs and the shaped sections and serving both as expansion joints and a drainage structure for the water desorbed by the hot faces of the slabs.

According to another feature of the invention, the means by which the plates are fixed to the shaped sections can break under the action of a differential expansion between the plates and the shaped sections, without destroying the seal.

According to a secondary feature of the invention, the structure also has a ferrule, whereof one edge is fixed to the walls of the enclosure, said ferrule covering the free edge of the peripheral rising portion of the metal skin. In order to further improve the flatness of the metal skin, levelling plates can be positioned beneath the shaped sections.

In order to permit the evacuation of the water desorbed by the hot faces of the concrete slabs filling the cavities defined between the sections of the support frame, the concrete floor of the enclosure can incorporate drains.

BRIEF DESCRIPTION OF THE DRAWINGS

The invention is described in greater detail hereinafter relative to non-limitative embodiments and the attached drawings, wherein show:

FIG. 1a is an enlarged sectional view of one of the support frames shown in FIG. 1.

DETAILED DESCRIPTION OF THE INVENTION

Figure 1:
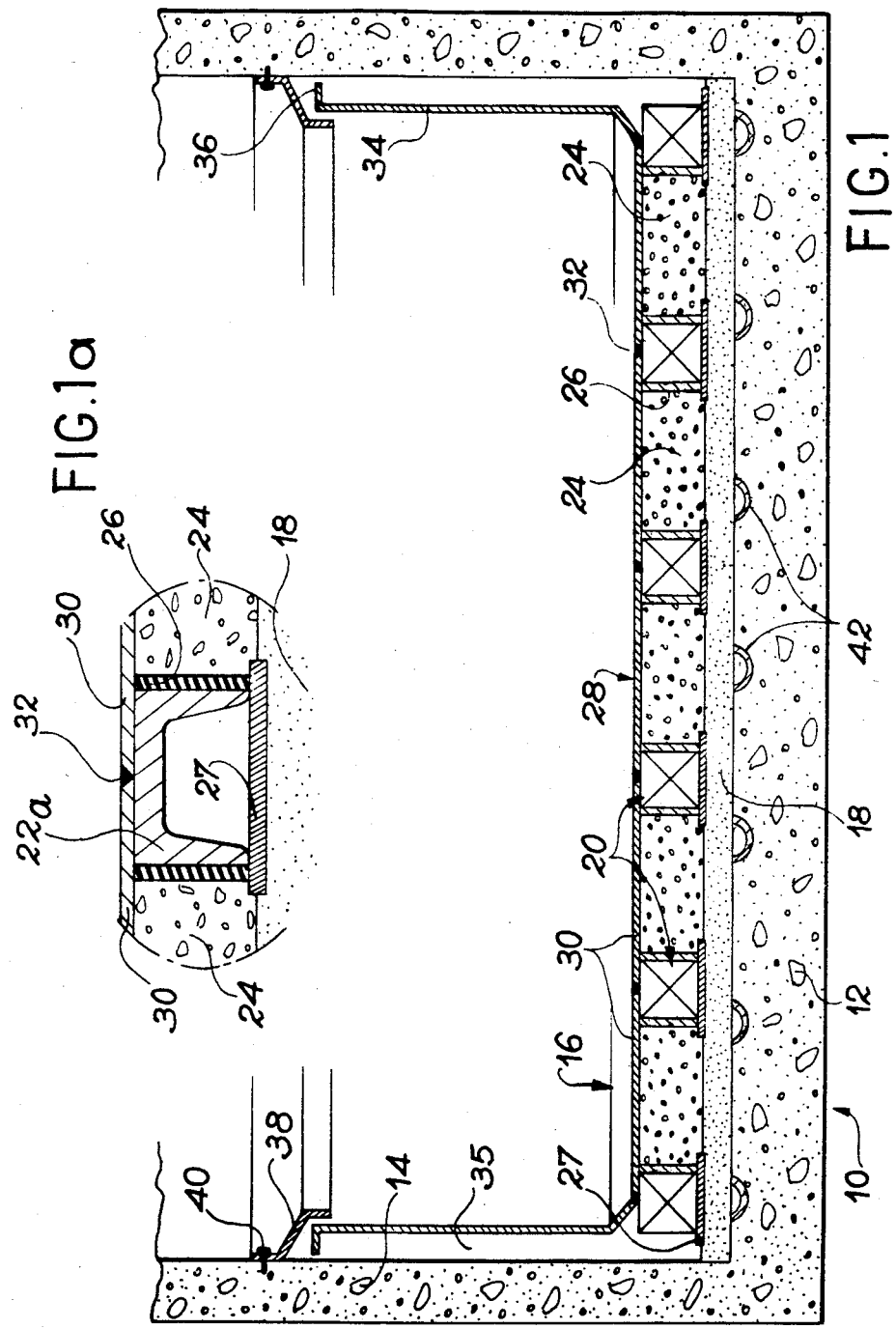
FIG. 1 a cross-sectional view of the lower part of a concrete enclosure having a protective structure constructed according to the present invention.

FIG. 1 shows the lower part of a concrete enclosure or caisson 10 incorporating a horizontal floor 12 and vertical walls 14.

According to the invention, the floor 12 and lower part of walls 14 are covered by a protective structure 16, which can receive a fluid liable to be raised to a high temperature, such as liquid sodium or a hydrocarbon.

Starting from the concrete floor 12 of the enclosure, the protective structure 16 comprises a horizontal porous layer 18 serving as a support and permitting expansion movements of the remainder of structure 16. This porous layer 18 can in particular be constituted by a dry sand bed, covering the concrete floor 12.

Figure 2:
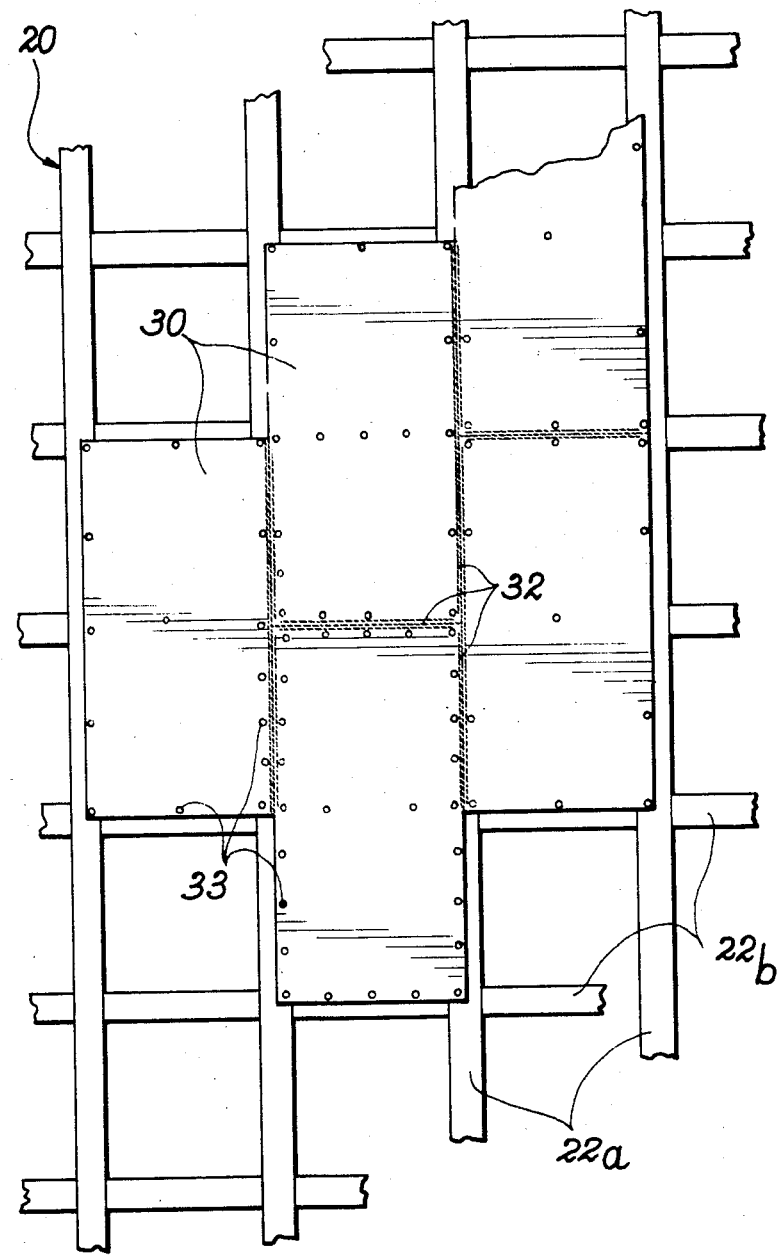
FIG. 2 a partly exploded plan view showing the arrangement of the plates, whose assembly by welding forms the metal skin of the protective structure, as well as the support frame constituted by intersecting shaped sections forming a square lattice system.

In addition, protective structure 12 has, above the porous layer 18, a support frame 20 constituted in the manner illustrated by FIG. 2, by shaped sections 22a, 22b intersecting in accordance with a regular lattice system and resting on porous layer 18.

In the represented embodiment, the shaped sections are arranged in two perpendicular directions 22a, 22b in order to form a square mesh network. The shaped sections can either have an inverted U-shaped section (as shown in larger scale in FIG. 1) or an I-shaped section and are welded to one another, so as to give a certain rigidity to the support structure 22.

The cavities formed between the intersecting sections 22a, 22b of the support structure are filled with an alveolar lining mainly consisting of concrete slabs 24, whose thickness is substantially identical to that of sections 22 and which fulfill the cavities defined between them almost completely. This lining also has flexible joints 26 constituted by plates made from a flexible material and which are optionally heatdestructable, such as polyurethane or expanded polystyrene, positioned between slab 24 and section 22. Functions of joints 26 are to serve as expansion joints between the shaped sections and the concrete slabs, and to permit the outflow of water desorbed by the hot face of slabs 24 towards the porous layer 18.

In order that the intersecting shaped sections 22a, 22b are substantially at the same level, preferably and in the manner shown in FIG. 1, the shaped sections are placed on metal sheets or plates constituting levelling plates 27.

Finally, the protective structure according to the invention comprises a tight metal skin 28 resting on support frame 20 and concrete slabs 24.

As is more particularly illustrated in FIG. 2, the metal skin 28 is constituted by e.g. rectangular flat metal plates 30, which are arranged in a staggered manner and are assembled by welds 32 arranged along the axes of the shaped sections. More specifically, the width of the plates 30 can be equal to the distance separating the axes of two successive parallel shaped sections 22a of support frame 20, the length of the plates 30 being double their width.

Obviously, this arrangement is only given in exemplified manner and square plates, or plates having other proportions could be used. In all cases, the arrangement of plates 30 on the support frame 20 is such that each edge of plate 30 is located on the axis of a shaped section 22.

In order to permit their tight assmbly by means of welds 32, the plates 30 are positioned contiguously edge-to-edge and have chamfers on their edges, which are turned upwards in the case of FIG. 1.

In order to ensure the flatness of the tight metal skin 28, despite the deformations generally caused by the local heating of the thin plates during their welding, said plates 30 are fixed to shaped sections 22 before making the welds 32. This fixing can be obtained by weld spots 33 distributed regularly along the periphery and surface of plates 30 facing sections 22.

The fixing means of sections 22 have a limited strength, so that they can break under the action of a differential expansion between tight skin 28 and support frame 20. It is consequently possible to maintain a good flatness of metal skin 28, even when large temperature variations of the fluid in the enclosure lead to considerable expansion of the structure.

Apart from the portion covering the concrete floor 12 of the enclosure, the protective structure 16 according to the invention has a peripheral rising portion 34 of metal skin 28 along the vertical enclosure walls 14. This peripheral rising portion 34 is at a certain distance from walls 14, so as to permit the expansion of the protective structure 16.

The free edge 36 of the peripheral rising portion 34 is above the maximum fluid level in enclosure 10. The centering of metal skin 28 is brought about by means of a metal sheet 38, fixed to the enclosure walls 14 by any appropriate means, such as pins 40, said sheet covering the free edge 36 of the peripheral rising portion of the metal skin.

As stated hereinbefore, the heat given off by the high temperature fluid contained in the concrete enclosure 10 leads to a desorption of water by the hot face of the concrete slabs 24. If no means was provided to evacuate this water, it could lead to an overpressure and to cracking of the metal skin 28. In order to eliminate this risk, insulating joints 26 have the function of permitting the evacuation of the water desorbed by the hot faces of slabs 24. For the same reason, the porous layer 18 must also make it possible to absorb the water from concrete slabs 24 by joints 26. Moreover, concrete floor 12 must also have on its upper face drains 42 making it possible to remove unwanted water.

Obviously the invention is not limited to the embodiments described hereinbefore and in fact covers all variants thereof. Thus, the lattice structure of the shaped sections constituting the support frame can differ from the square lattice structure shown in FIG. 2 and the plates forming the tight metal skin can have an other than rectangular shape as shown in FIG. 2.

What is claimed is:

1. A protective structure for a concrete floor and walls of a concrete enclosure which is to contain a high temperature fluid, wherein said protective structure comprises a porous layer covering the concrete floor of the enclosure, a support frame made from shaped sections intersecting in accordance with a regular lattice structure, and resting on the porous layer, a lining filling the cavities defined between the shaped sections and a tight metal skin resting on the support frame and constituted by thin plates fixed to the shaped section and assembled by welds placed along axes of the shaped sections, said metal skin having a peripheral rising portion along the walls of the enclosure, said peripheral rising portion defining an upper free edge positioned above a maximum fluid level in the enclosure.

2. A structure according to claim 1, wherein the lining comprises concrete slabs filling the cavities and flexible joints formed between the slabs and the shaped sections.

3. A structure according to claim 1, wherein the plates are fixed to the shaped sections by fixing means, which can break under action of a differential expansion between plates and shaped sections.

4. A structure according to claim 1, wherein it also comprises a metal sheet, whereof one edge is fixed to the walls of the enclosure, said sheet covering the free edge of the peripheral rising portion of the metal skin.

5. Structure according to claim 1, wherein levelling plates are positioned beneath the shaped sections.

6. A structure according to claim 1, wherein the porous layer is constituted by a dry sand bed.

7. A structure according to claim 1, wherein the concrete floor has drains on its upper face.

* * * * *